No. 673,701. Patented May 7, 1901.
D. CLINE.
COOKING STOVE.
(Application filed Oct. 12, 1900.)
(No Model.) 3 Sheets—Sheet 2.

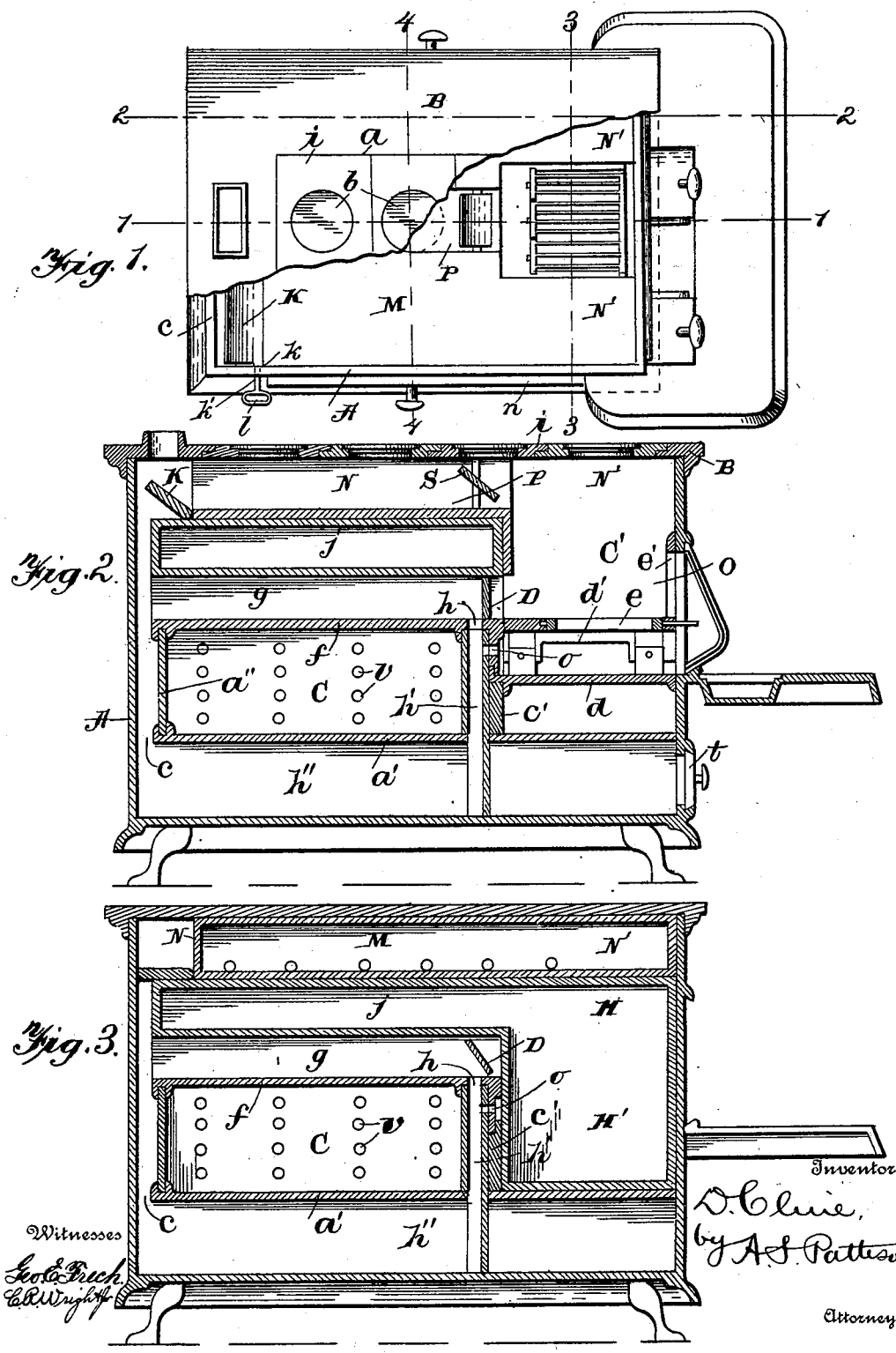

Witnesses
Geo. E. Frech
E. A. Wright

Inventor
D. Cline,
by A. S. Pattison
Attorney

THE NORRIS PETERS CO., PHOTO-LITHO., WASHINGTON, D. C.

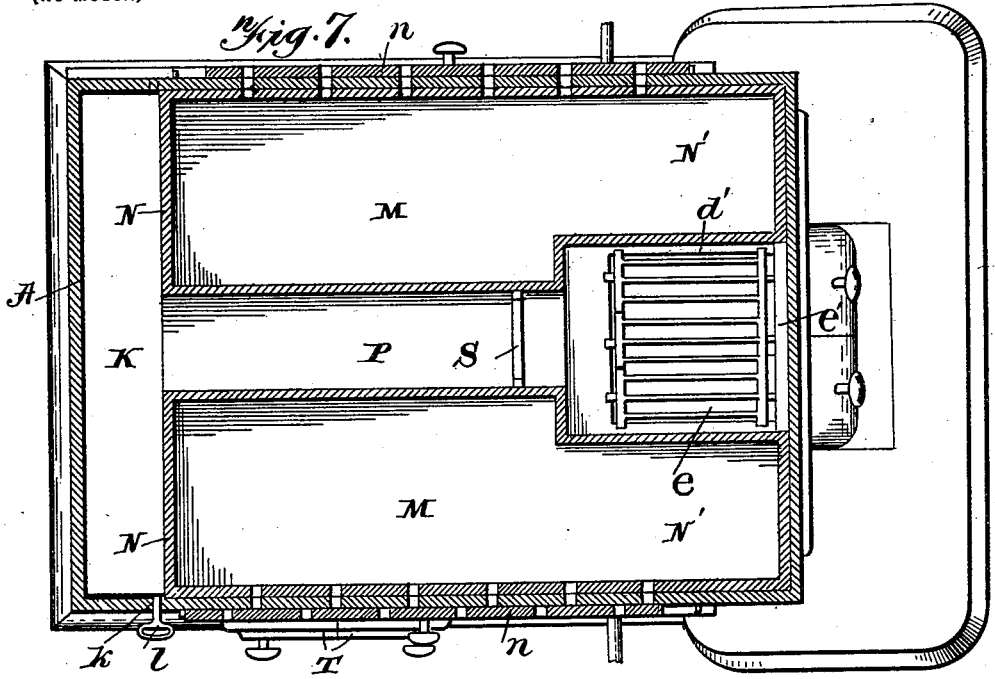
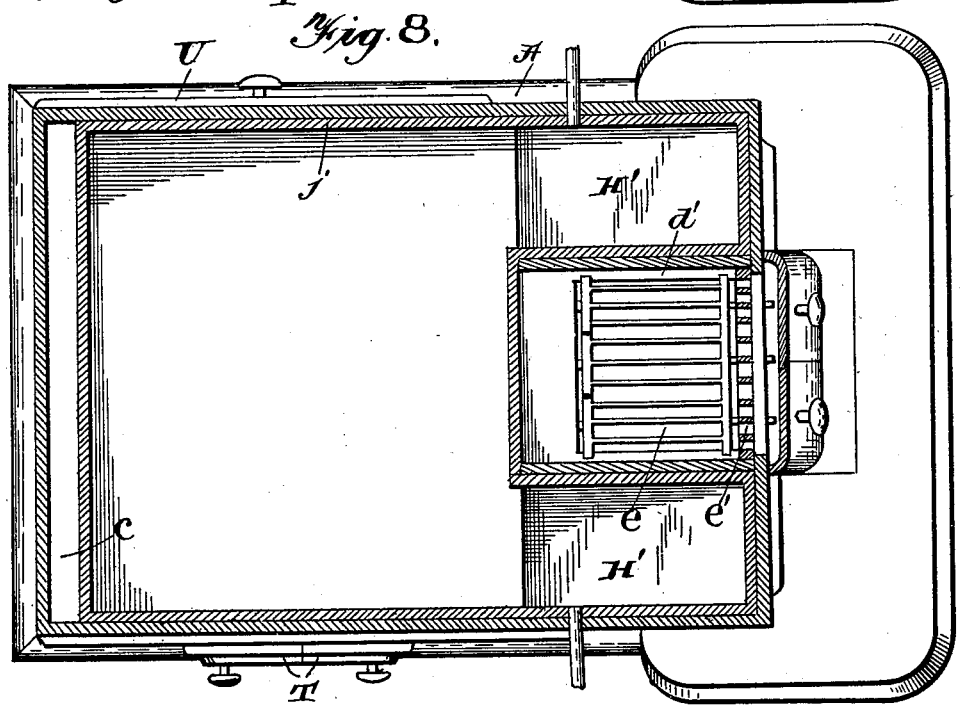

UNITED STATES PATENT OFFICE.

DAVID CLINE, OF WATSONTOWN, PENNSYLVANIA.

COOKING-STOVE.

SPECIFICATION forming part of Letters Patent No. 673,701, dated May 7, 1901.

Application filed October 12, 1900. Serial No. 32,874. (No model.)

*To all whom it may concern:*

Be it known that I, DAVID CLINE, a citizen of the United States, residing at Watsontown, in the county of Northumberland and State of Pennsylvania, have invented new and useful Improvements in Cooking-Stoves, of which the following is a specification.

My invention relates to improvements in cooking-stoves, and pertains more particularly to a combined cooking-stove and a hot-water generator.

One object of my invention is to provide a stove of the class described in which the tank for generating hot water has a greater heating-surface and so arranged that the draft from the fire can be either above or below the tank or both below and above.

Another object of my invention is to provide means for protecting the generating-tank from the full force of the heat when the stove is simply used for cooking, as would be the case in summer-time.

A still further object of my invention is to provide a protector which is easily and quickly placed in the stove without in the least affecting the cooking qualities of the stove.

Figure 4:
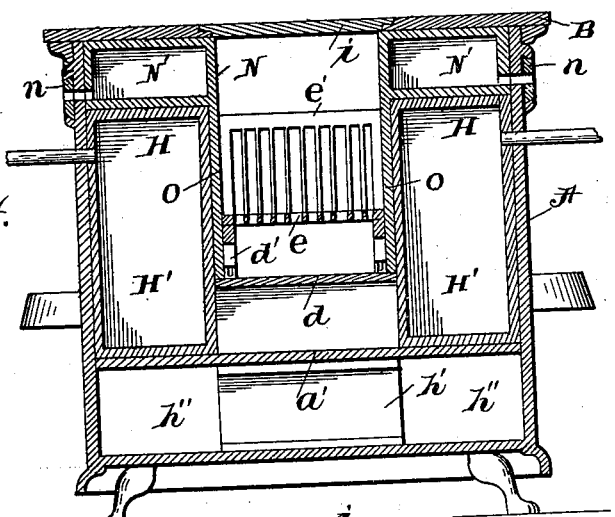
Figure 5:
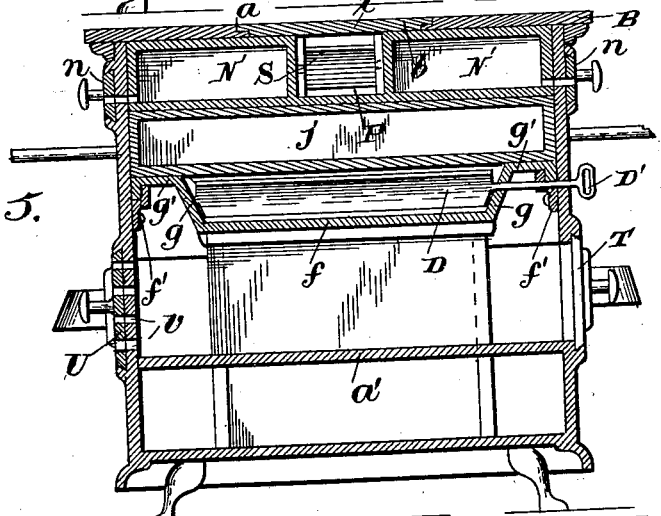
Figure 6:
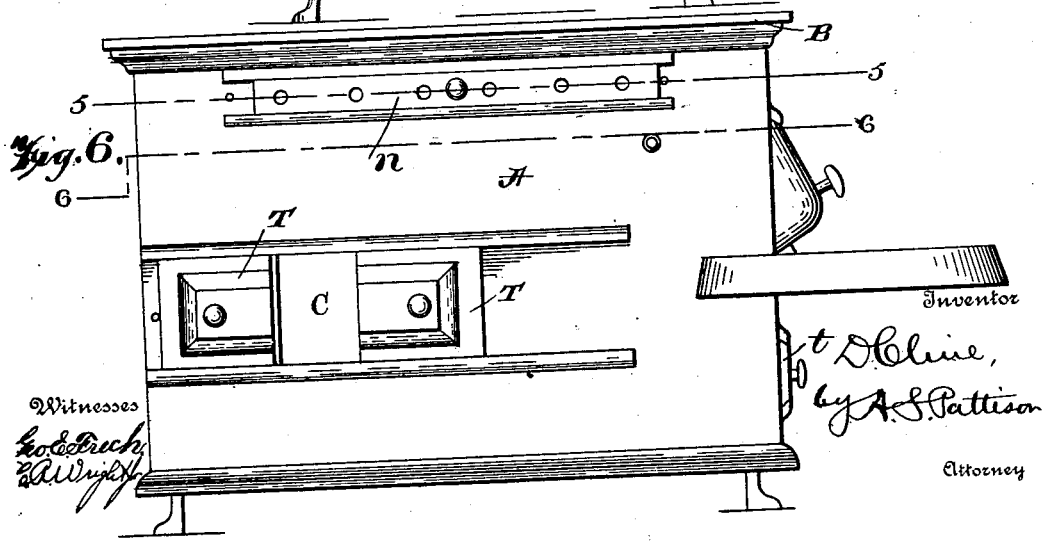

Referring now to the drawings, Figure 1 is a top plan view, partly broken away, showing the arrangement of the lids and the protecting-plates. Fig. 2 is a longitudinal sectional view on the line 1 1, Fig. 1. Fig. 3 is a longitudinal sectional view on the line 2 2, Fig. 1. Fig. 4 is a transverse sectional view on the line 3 3, Fig. 1. Fig. 5 is a transverse sectional view on the line 4 4, Fig. 1. Fig. 6 is a side view of my improved stove. Fig. 7 is a longitudinal sectional view taken on the line 5 5, Fig. 6. Fig. 8 is a longitudinal sectional view taken on the line 6 6, Fig. 6.

Referring now to the drawings, A represents the outer casing of the stove, which is of the ordinary shape. The said casing has a removable top B, which is provided with a longitudinal opening $a$, which extends nearly from end to end, said opening $a$ being provided with a number of overlapping plates $i$, which are adapted to close said opening, and each plate being provided with a stove-lid $b$ of the ordinary type. The casing has near the bottom a horizontal partition $a'$, which extends nearly to the end, thus leaving a transverse opening $c$, which will be hereinafter more fully described. The said partition $a'$ forms the bottom of the oven C, and extending upward from the end of the said partition $a'$, adjacent to the opening $c$, is a transverse vertical partition $a''$, which forms the end of the oven. A second partition $c'$ is arranged transverse the casing, and extending forward from the partition to the front of the casing is a plate $d$, which forms the bottom of the fire-box C'. Resting on said plate is a grate-frame $d'$, which carries a series of independently-rocking grates $e$ and the upwardly-extending grate $e'$. Resting on the transverse partitions $a''$ and $c'$ is a plate $f$, which forms the top of the oven C. The said plate $f$ is provided on either side with longitudinally-extending inclined portions $g$, which are provided with horizontal portions $g'$, which rest upon the strips $f'$, carried by the side of the casing. The strips $f'$ not only serve as supports for the top of the oven, but also form a comparatively air-tight joint. The horizontal portions $g'$ of the plate $f$ serve as supports for the generating-tank and also for the purpose of keeping the tank off the plate $f$, forming a space or flue between the top of the oven and the bottom of the boiler. A damper D is pivoted between the forward ends of the inclined portions $g$, adjacent the fire-box, whereby the said space or flue $c$ may be closed. The pivoted connection at one side of said damper extends out through the oven C and has an operating-handle D' on the outside of the stove, whereby the damper can be opened or closed.

Below the damper D in the plate $f$ is an opening $h$, which registers with an air passage-way $h'$, which extends through the oven C and is in communication with the space $h''$ below the oven, whereby a hot-air passage or current is conducted beneath the oven C and out through the transverse opening $c$.

The rear end of the fire-box has a series of openings $o$, which communicate at all times with the air passage-way $h'$, thereby heating the space below the oven. The plate $d$ does not extend all the way across the stove, but leaves a space on either side thereof.

The generating-tank has a flat portion $j$, which rests on the horizontal portion $g'$ of the top of the oven, thus leaving an air-space therebelow. The said tank is provided with forwardly-extending portions H, having downwardly-extending portions H', which are adapted to enter the spaces on either side of the grates and which extend down to the horizontal portion in the bottom of the casing and rest thereon. It will be readily seen that the tank nearly completely surrounds the fire-box, or, in other words, forms three sides of the fire-box. Thus a greater heating-surface is obtained than in the type of stove in ordinary use. The rear flat portion of the tank does not extend to the end of the casing, but leaves a space or opening equal to the distance between the end of the oven and the casing. By this construction it will be readily seen that a flue $c$ is formed there to allow the hot air or smoke which passes under the oven or between the oven and the tank to pass out through the opening in the top of the stove, which is connected with the ordinary stovepipe.

The top of the flat portion $j$ of the tank carries a damper K, which is adapted to close the opening left at the end of the tank. The said damper is pivoted, as shown at $k$, one of the pivots extending through the casing, as shown at $k'$, and having an operating-handle $l$ attached thereto whereby the damper is operated.

The tank on either side is provided with outwardly-extending pipes passing through the casing and connected to a heating device of any character.

When the stove is not being used for heating purposes, I provide a protecting-plate N, which is to be readily placed over the tank to prevent the heat from coming in direct contact therewith. The protecting-plate N consists of a flat hollow portion M, which has outwardly-extending portions N', which correspond to the outwardly-extending portions of the tank. The inner faces of said extending portions are provided with downwardly-extending plates O of a size equal to that of the downwardly-extending portions of the tank. When this protector is used, it will readily be seen that instead of the tank forming the fire-box the said protecting-plate covers all portions of the tank coming in contact with the fire-box. The flat portion M of the protecting-plate has a central opening or channel P, forming a smoke-conduit. The said channel is directly below the row of plates carried by the top of the stove, whereby the stove-lids carried thereby are in direct communication with the fire.

The box-like portion M is provided at each side with openings which register with openings in the side of the casing. Sliding dampers $n$ are arranged on the outside of the casing, having openings registering with the opening in the casing. It will be clearly seen that the box-like portion of the protecting-plate can be cooled as desired without affecting the heat within the central channel P. The said protecting-plate is not as long as the tank, so that the damper K can be swung up to close the outer end of the channel P. The said channel is also provided at its inner ends with a pivoted damper S, whereby the end of the channel adjacent the fire-box can be closed.

One side of the stove is provided with doors T, which open into the oven, and the opposite side is provided with a sliding damper U, which has openings registering with openings $v$ in the side of the oven. The forward end of the stove is provided with a damper $t$, opening into the lower air-passage beneath the oven.

When my device is not used for heating purposes, the protecting-plate is inserted, and it will be readily seen that all portions of the tank exposed directly to the heat are covered by the said protecting-plate. If it is desired simply to cook on the top of the stove, the damper D is closed, the damper S is opened, and the damper K swung upward, so that the end of the channel beneath the lids is partially closed at its near end and the heat confined therein to a certain extent. The operation would be the same if the protecting-plate were not used, except that the heat would not be confined directly below the lids. When it is desired to bake, the damper S is closed, the damper D opened, and the damper K swung down to close the flue $c$, whereby the heat is confined between the boiler and the top of the oven, in the space below, and at the end thereof.

When the device is used for heating purposes, the protector is removed, and the tank then forms the fire-box, the whole top of the tank being exposed directly to the heat. The tank can be entirely surrounded by heat by simply opening the damper D, which allows the heat to pass beneath, around the end, and through the passage $c$.

What I claim, and desire to secure by Letters Patent, is—

1. A combined cooking-stove and hot-water generator, comprising a casing, a generating-tank therein, and a protecting-box between the tank and the top of the casing and having a horizontal flue, substantially as described.

2. A combined cooking-stove and hot-water generator, comprising a casing, a fire-box therein, a generating-tank adjacent said fire-box, a protecting-box, between the tank and the top of the casing, and having a horizontal central flue, and a damper at either end of said flue, substantially as described.

3. A combined cooking-stove and hot-water generator, comprising a grate, an oven adjacent said grate, a tank surrounding said grate and extending over the oven and having a passage-way between the tank and the oven and a passage-way above the tank, and means for directing the draft in either passage, substantially as described.

4. A combined cooking-stove and generator, comprising a casing, a grate situated in the forward end thereof, an oven in rear of said grate, upwardly and longitudinally arranged raised portions, carried by each side of the oven, a tank resting on said raised portions, and having forwardly and downwardly extending portions surrounding the grate, substantially as described.

5. A combined cooking-stove and generator, comprising a casing carrying a grate, an oven within said casing, a tank above said oven and having an air-passage therebetween, a damper closing the inlet of said passage adjacent the grate, and a damper carried by the rear upper end of the tank for closing the space thereabove, substantially as described.

6. A combined cooking-stove and generator, comprising a casing, an oven therein, a tank above said oven and having an air-passage therebetween and at the end and above, and a damper carried by the tank for closing the end passage or the top passage, substantially as described.

7. A combined cooking-stove and generator, comprising a casing, an oven therein, having an air-passage beneath it, a tank above said oven and having an air-passage therebetween and at the end, and an air-passage communicating with the forward end of the passage between the tank and the oven and extending through the oven and communicating with the air-space below the oven, substantially as described.

8. A combined cooking-stove and generator, comprising an oven, a tank thereabove, a removable protecting-box, adapted to cover the heating-surface of the tank, and means for ventilating said box, substantially as described.

9. A combined cooking-stove and generator, comprising a casing, an oven therein, a horizontally-arranged, centrally-located plate, extending forwardly from the top of the oven, a grate-frame, removably mounted thereon, and a tank on said oven having forwardly and downwardly extending portions filling the space on either side of the plate carrying the grate-frame, substantially as described.

10. A combined cooking-stove and generator, comprising a casing, an oven therein, a tank above the oven and having therebetween a passage and also at the end and top, a damper for closing the inner end of the passage between the oven and the tank, a damper for closing the outer end of the top passage or the upper end of the end passage, substantially as described.

11. A combined cooking-stove and generator, comprising a casing, a grate in the forward end, an oven having an air-passage beneath and behind it, a tank above the oven and having an air-passage above therebetween, and at the rear end, and an air-passage communicating with the forward end of the passage between the tank and the oven and extending through the oven and communicating with the space below the oven, a damper carried by the inner end of the passage between the oven and the tank, a protecting-box resting on the tank and having a central flue, a damper carried by said box at the inner end of said flue, and a damper carried by the rear end of the tank and adapted to close either the flue in the box or the flue in the rear of the tank, substantially as described.

In testimony whereof I have hereunto set my hand in the presence of two subscribing witnesses.

DAVID CLINE.

Witnesses:
CHARELLA SNODDY,
O. S. BARTO.